United States Patent
Heck et al.

(10) Patent No.: US 10,422,553 B2
(45) Date of Patent: Sep. 24, 2019

(54) SOLAR REFRACTION DEVICE FOR HEATING INDUSTRIAL MATERIALS

(71) Applicant: THE BOEING COMPANY, Chicago, IL (US)

(72) Inventors: David P. Heck, Chicago, IL (US); Michael R. Zolnowski, Chicago, IL (US)

(73) Assignee: The Boeing Company, Chicago, IL (US)

( * ) Notice: Subject to any disclaimer, the term of this patent is extended or adjusted under 35 U.S.C. 154(b) by 818 days.

(21) Appl. No.: 14/829,553

(22) Filed: Aug. 18, 2015

(65) Prior Publication Data

US 2017/0051947 A1 Feb. 23, 2017

(51) Int. Cl.
| | | |
|---|---|---|
| F24S 20/30 | (2018.01) | |
| F24S 50/20 | (2018.01) | |
| F03G 6/06 | (2006.01) | |
| F24S 23/30 | (2018.01) | |
| F24S 20/20 | (2018.01) | |

(52) U.S. Cl.
CPC .............. *F24S 20/30* (2018.05); *F03G 6/06* (2013.01); *F24S 23/30* (2018.05); *F24S 50/20* (2018.05); *F24S 23/31* (2018.05); *F24S 2020/23* (2018.05); *Y02E 10/46* (2013.01); *Y02P 80/24* (2015.11)

(58) Field of Classification Search
CPC ... F03G 6/06; F24S 20/30; F24S 23/30; F24S 23/31
USPC .......................................... 126/678, 698–700
See application file for complete search history.

(56) References Cited

U.S. PATENT DOCUMENTS

| | | | | |
|---|---|---|---|---|
| 2009/0194097 A1* | 8/2009 | Rabinoff | ............. | H01L 31/0547 126/684 |
| 2010/0024801 A1* | 2/2010 | Lin | ......................... | F24S 10/90 126/593 |
| 2013/0139808 A1 | 6/2013 | Lin et al. | | |
| 2013/0167832 A1 | 7/2013 | Kim | | |
| 2013/0255256 A1* | 10/2013 | Logothetis | ............. | F03G 6/068 60/641.15 |

FOREIGN PATENT DOCUMENTS

| | | | | |
|---|---|---|---|---|
| AU | 68528 81 A1 | 6/1981 | | |
| CN | 104 583 686 | 4/2015 | | |
| JP | 11026800 A | * 1/1999 | ............. | F24F 23/31 |
| WO | WO-2013180344 A1 | * 12/2013 | ............. | H02S 20/10 |

OTHER PUBLICATIONS

European Patent Office Extended European Search Report, Application No. 16173996.6-1605, dated Dec. 2, 2016.

* cited by examiner

*Primary Examiner* — Avinash A Savani
*Assistant Examiner* — Aaron H Heyamoto
(74) *Attorney, Agent, or Firm* — Toler Law Group, PC

(57) ABSTRACT

Disclosed is a solar refraction device ("SRD") for heating industrial materials in a heating container, having a bottom, with diffuse solar energy that impinges on an outside surface of the SRD and is refracted through the SRD. The SRD may include a lens array assembly and a plurality of lens panes attached to the lens array assembly. The lens array assembly may include an outside surface corresponding to the outside surface of the SRD, an inside surface, and a plurality of lens array sub-assemblies.

15 Claims, 12 Drawing Sheets

SOLAR REFRACTION DEVICE FOR HEATING INDUSTRIAL MATERIALS

BACKGROUND

1. Field

This invention is generally related to solar systems, and in particular, to solar systems utilized to melt industrial materials.

2. Related Art

There is a need to improve the energy efficiency associated with heating and/or melting industrial materials at industrial volumes. At present in the United States ("US"), melting industrial materials entails a large quantity of energy with aluminum fabrication alone accounting for about 30% of that energy consumption. An even greater amount of energy is required when recycled steel is added. As such, major US industries, especially those industries related to metal recycling and stock material fabrication, occupy a major portion of the nation's total energy consumption. Therefore, for nearly every industry involved in the process of fabrication or recycling of existing materials, there is a need for high amounts of energy to melt materials, heat the materials, or for other key stage, or stages, of the process.

In general, the two major problems with conventional heating (e.g., known furnaces (also known as burners) utilize gas, induction, blast, and electric arc furnaces ("EAFs")) are their dependence on limited and fossil fuels (e.g., coal, oil, and natural gas), as well as the inefficiencies in how they transfer the generated thermal energy to heat a material. It is appreciated by those of ordinary skill in the art that these types of furnaces have significant energy losses during the thermal energy transfer process (i.e., the process of heating the furnace and then utilizing that heat to melt or heat the material), which ultimately results in about 30 to 40% efficiency. This results generally because large amounts of energy input into a furnace does not directly translate to thermal energy. As an example in a blast furnace, requires massive quantities of input energy to raise its temperature to its operating temperature. In aluminum melting, for example, only about 40% of the energy utilized by the furnace goes to actually melting the aluminum.

This problem is also similar for furnaces utilizing induction melting, which is done typically open to air. Electrical resistance furnaces ("ERTs") that utilize the principle of indirect heating are capable of utilizing about 40% of their input energy for melting but in practice are only typically about 26% efficient because ERT furnaces typically experience other energy losses that include heating the air and then losing hot air through ventilation conduction to the insulating liner of the furnace and losses of energy when opening the ERT furnace. As a result, EAF furnaces require large quantities of electrical power and can have adverse environmental effects. Additionally, in many EAF furnaces additionally gas burners are typically utilized to assist in heat scrap metal to a temperature where the metal conducts electricity efficiently so as allow the EAF furnace to run properly. Moreover, another major issue with these types of furnaces is the large carbon cost of the process where the amount of carbon dioxide output by these systems. Unfortunately, their continued use is largely due to the relatively cheap cost of current sources of fuel.

Attempts to address and solve these problems utilizing "green energy" (i.e., renewable energy sources) have yet to materialize. Known uses of solar energy are not capable of addressing or solving these problems because known solar technologies are limited in their capacity, window of operation, and overall efficiency when capturing solar energy and transferring it into a usable fashion. Specifically, known solar systems have a number of inefficiencies in how they utilize solar energy to either heat an object or generate electricity. These solar cells placed on solar panels utilize photovoltaic cells to convert solar energy impinging on the solar cell into electricity. Common modernly used crystalline silicon solar cells output on average about 18% energy conversion due to losses of heat and the electricity transfer within the solar cells.

In addition to solar cells, modern solar systems also include systems that heat objects, such as water pipes for example, that transfer the resulting heat energy to other objects for heating those objects or generating electricity through movement of, for example, water through the pipes to a turbine. Moreover, another problem with solar energy is that it is not concentrated enough in any given area to use on an industrial scale or it requires a system in place to utilize the energy in a process which converts it to useable electricity.

Attempts to solve these problems have includes using solar reflector systems to attempt to reflect and focus energy into a small area that may either generate power with a solar cell, heat water to generate electricity through a turbine, or heat a small crucible containing some material in a small furnace. However, even with the use of reflectors, the resulting system still do not have high efficiency. The ones the utilize solar cells still only have 18% efficiency. The ones that heat water still have the same thermal loses as the non-reflector solar heating systems. Additionally, the small furnaces lose energy from having to heat a crucible. Moreover, all of these solar reflector systems lose energy from transferring energy to additional components in the system and from reflection angle losses. Furthermore, some of these system are stationary in a way that does not allow them to follow the Sun and, therefore, limits the amount of time that they may operate. As a result, without a change to modern solar energy capability, solar energy cannot currently compete on a commercial scale and switching to such a technology would not be a cost benefit for most industries.

This is unfortunate because solar energy is a free resource which would over long periods of time, pay for itself in any application that can properly capture and transfer solar energy into a usable fashion. As such, there is a need for solar energy capture system that is capable of producing a sufficient amount of energy for use in modern industrial processes that include heating or melting of industrial materials.

SUMMARY

Disclosed is a solar refraction device ("SRD") for heating industrial materials in a heating container, having a bottom, with diffuse solar energy that impinges on an outside surface of the SRD and is refracted through the SRD. The SRD may include a lens array assembly and a plurality of lens panes attached to the lens array assembly. The lens array assembly may include an outside surface corresponding to the outside surface of the SRD, an inside surface, and a plurality of lens array sub-assemblies. A sub-plurality of lens panes of the plurality of lens panes may be attached to a corresponding lens array sub-assembly of the plurality of lens array sub-assemblies. Moreover, each lens array sub-assembly has a convex shape and may be configured to have a focal length corresponding to the lens array sub-assembly which results in the lens array assembly having a plurality of focal lengths.

As an example of operation, the SRD is configured to perform a method that includes refracting impinging solar energy on the SRD through the lens array assembly having the plurality of lens array sub-assemblies. The refracted solar energy is then focused onto a plurality of focal points, where each focal point corresponds to a lens array sub-assembly of the plurality of lens array sub-assemblies. Utilizing the plurality of focal points, the process then creates a heating area within the heating container. The process then heats the industrial material within the heating container at the heating area utilizing the focused refracted solar energy.

Also disclosed is a method for fabricating the SRD. The method includes determining the type and amount of industrial material to be melted and determining an amount of energy needed to melt the industrial material. An array size of a lens array assembly is then determined for producing the previously determined amount of energy, where the lens array assembly is configured to refract solar light impinging on the lens array assembly to the industrial material. The method then includes determining a focal length of the lens array assembly, assembling a support frame to support the lens array assembly, and assembling the lens array assembly.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

A solar refraction device ("SRD") for heating industrial materials in a heating container, having a bottom, with diffuse solar energy that impinges on an outside surface of the SRD and is refracted through the SRD is disclosed in accordance with the present disclosure. The SRD may include a lens array assembly and a plurality of lens panes attached to the lens array assembly. The lens array assembly may include an outside surface corresponding to the outside surface of the SRD, an inside surface, and a plurality of lens array sub-assemblies. A sub-plurality of lens panes of the plurality of lens panes may be attached to a corresponding lens array sub-assembly of the plurality of lens array sub-assemblies. Moreover, each lens array sub-assembly has a convex shape and may be configured to have a focal length corresponding to the lens array sub-assembly which results in the lens array assembly having a plurality of focal lengths.

As an example of operation in accordance with the present disclosure, the SRD is configured to perform a method that includes refracting impinging solar energy (i.e., the solar energy that directly strikes and/or illuminates the SRD which may diffuse (i.e., spread) along an outer surface of the SRD) on the SRD through the lens array assembly having the plurality of lens array sub-assemblies. The refracted solar energy is then focused onto a plurality of focal points, where each focal point corresponds to a lens array sub-assembly of the plurality of lens array sub-assemblies. Utilizing the plurality of focal points, the process then creates a heating area within the heating container. The process then heats the industrial material within the heating container at the heating area utilizing the focused refracted solar energy.

Also disclosed is a method for fabricating the SRD in accordance with the present disclosure. The method includes determining the type and amount of industrial material to be melted and determining an amount of energy needed to melt the industrial material. An array size of a lens array assembly is then determined for producing the previously determined amount of energy, where the lens array assembly is configured to refract solar light impinging on the lens array assembly to the industrial material. The method then includes determining a focal length of the lens array assembly, assembling a support frame to support the lens array assembly, and assembling the lens array assembly. In this disclosure the industrial material may include any type of material utilized in an industrial, heating, or melting process. Examples of industrial material may include metallic industrial materials such as, for example, aluminum, steel, iron or other metals or alloys, non-metallic industrial material such as, for example, plastics or other recyclable non-metals, gasses, or liquids (such as, for example, water).

Figure 1:
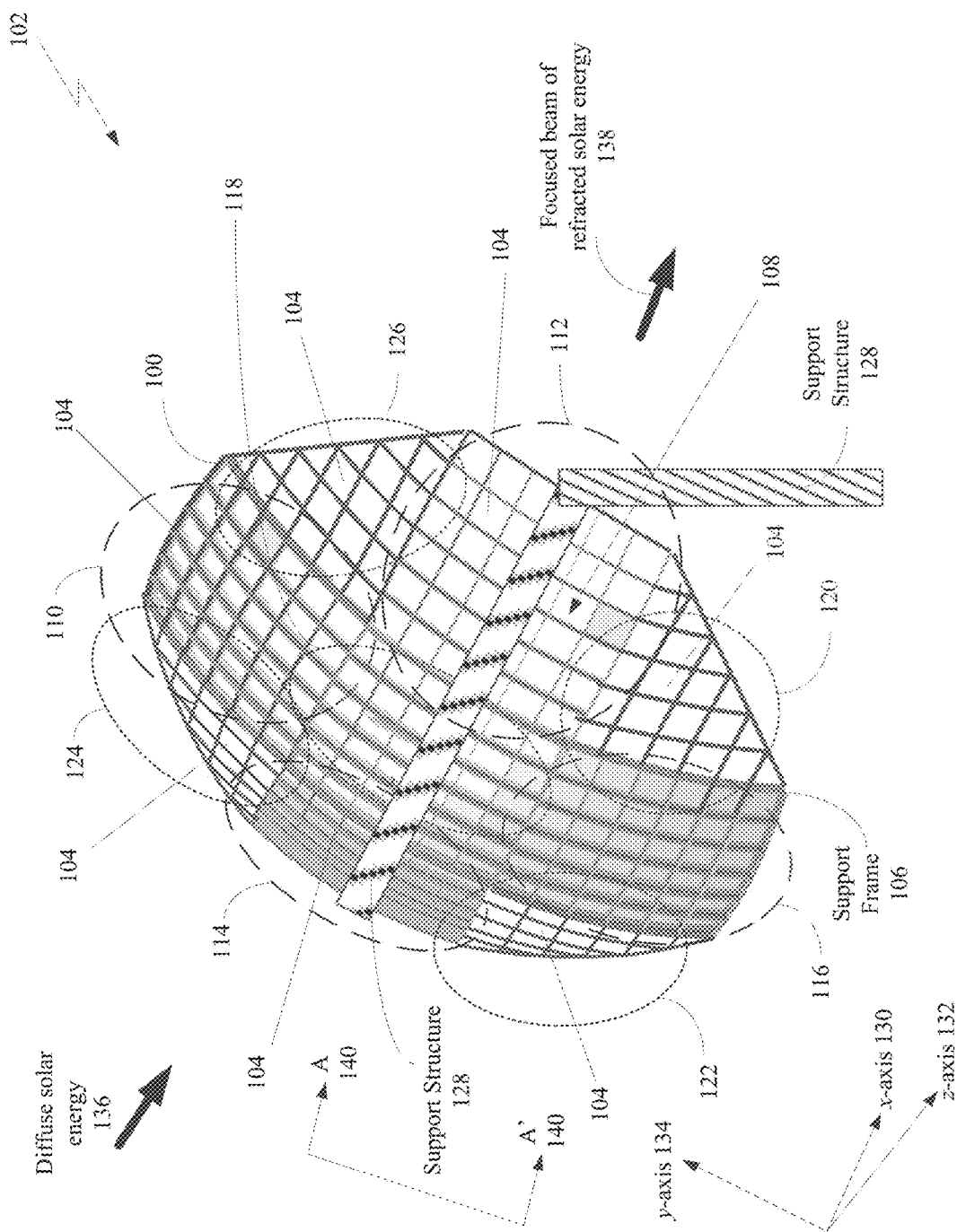
FIG. 1 is a perspective back-view of an example of an implementation of a lens array assembly of a solar refraction device ("SRD") in accordance with the present disclosure.

In FIG. 1, a perspective back-view of an example of an implementation of a lens array assembly 100 of a solar refraction device ("SRD") 102 is shown in accordance with the present disclosure. The SRD 102 includes the lens array assembly 100 and a plurality of lens panes 104 attached to the lens array assembly 100. In this example, the lens array assembly 100 may include a support frame 106 constructed of a rigid material such as, for example, a metal such as steel or aluminum or other rigid non-metallic materials. The support frame 106 may include a plurality of openings that are configured to accept the plurality of lens panes 104, which are each configured to be attached to the lens array assembly 100. The support frame 106 is constructed of a rigid material that is strong enough to support the weight of, and stresses caused by, the plurality of lens panes 104 placed within the plurality of opening in the support frame 106 and capable of withstanding prolonged exposure in the environment to things such as, for example, electromagnetic radiation, thermal heat, and ultraviolent radiation without significantly degrading or warping. The lens array assembly 100 includes an outside surface 108 that also corresponds to the outside surface of the SRD 102, an inside surface (not shown), and a plurality of lens array sub-assemblies. In general, each lens array sub-assembly is a discrete panel of the lens array assembly 100.

In this example, the lens array assembly 100 is shown having nine (9) lens array sub-assemblies 110, 112, 114, 116, 118, 120, 122, 124, and 126. Each lens array sub-assembly is shown having a sub-plurality of lens panes (from the total plurality of lens panes 104) attached to the corresponding lens array sub-assembly. As an example, part of a support structure 128 is also shown attached to one side of the lens array assembly 100. The support structure 128 may be attached to the support frame 106 in a way that allows the support structure 128 to maintain the lens array assembly 100 at a predetermined distance from a heating container (not shown but described later) where the predetermined distance is a distance that is based on the multiple focal lengths of the lens array assembly 100 (described in more detail later). The support structure 128 may be connected to, or part of, a solar tracker (not shown), where the solar tracker is configured to move the support structure 128 (and the as the lens array assembly 100) in a manner that maintains a high amount of solar energy being refracted through the SRD 102 and focused at a heating area. In this disclosure, a "high" amount of solar energy is considered enough solar energy for the SRD 102 to operate according to the present description. Similar to the support frame 106, the support structure 128 may also be constructed of constructed of a rigid material that is strong enough to support the weight of, and stresses caused by, the lens array assembly 100 an may include metallic and non-metallic rigid materials. Furthermore, in this example, the lens array assembly 100 is shown to have a three-dimensional convex shape with each corresponding lens array sub-assemblies 110, 112, 114, 116, 118, 120, 122, 124, and 126 also being convex. The convex shape is approximately parabolic along the x-axis 130 and z-axis 132 and also along the y-axis 134 and z-axis 132. In an example of operation, the SRD 102 would refract diffuse solar energy 136 (i.e., the impinging solar energy) that impinges on the outside surface 108 (of both the SRD 102 and lens array assembly 100) through the SRD 102 resulting in a focused beam of refracted solar energy 138 that is focused in a direction along the z-axis 132 away from the inside surface of the lens array assembly 100.

In this example, it is appreciated by those of ordinary skill in the art that only nine (9) lens array sub-assemblies 110, 112, 114, 116, 118, 120, 122, 124, and 126 have been shown in FIG. 1 for purpose of illustration. However, the lens array assembly 100 may include more or less lens array sub-assemblies based on design and application of the SRD 102. As will be described later, in general each lens array sub-assembly will produce a corresponding focused beam of refracted solar energy that will have a focal length that corresponds to the specific lens array sub-assembly. The resulting focal lengths from the different lens array sub-assemblies may be different from each other so that the combined focused beams of refracted solar energy (for each lens array sub-assembly) combines to form the focused beam of refracted solar energy 138 that produces a heating area (described later) that is not focused to approximate point away (i.e., a single hot spot) from the lens array assembly 100 (described in more detail later).

From the detail in FIG. 1, in this example, the SRD 102 is shown to have an octagon two-dimensional convex shaped lens array assembly 100. Additionally, the lens array assembly 100 is shown to have five (5) rectangular shaped two-dimensional convex lens array sub-assemblies 110, 112, 114, 116, and 118 and four (4) triangular shaped two-dimensional convex lens array sub-assemblies 120, 122, 124, and 126. Moreover, each rectangular shaped two-dimensional convex lens array sub-assemblies 110, 112, 114, 116, and 118 is shown to have 8 by 8 (i.e., 64) lens panes (or plurality of openings for 64 lens panes) and each triangular shaped two-dimensional convex lens array sub-assemblies 120, 122, 124, and 126 is shown to have 28 lens panes (or plurality of openings for 28 lens panes) and eight (8) half-sized lens panes (or plurality of openings for 8 half sized lens panes). This results in the SRD 102 having, in this example, a total of 432 lens panes and 32 half sized lens panes. Each of the lens panes of the plurality of lens panes 104 may be flat lens panes approximating a parabolic shape in the corresponding lens array sub-assembly based on the size and number of the discrete flat lens panes in the lens array sub-assembly or actual convex shaped lens panes. Furthermore, each lens panes may be made from either glass, acrylic, or other similar media. Moreover, each lens pane may be a flat or slope lens pane or a Fresnel lens such that the SRD 102 may be assembled from a combination of flat lens panes, sloped panes, and Fresnel lenses. In general, the lens panes may be removable and interchangeable within the lens array assembly 100. Additionally, in order to make the SRD 102 more dynamic, individual controls (not shown) may be installed in sections of the lens array assembly 100 or each opening that is configured to receive a lens pane in the lens array assembly 100 such that the controls may be able to adjust the position of the individual panes to adjust the focus of the SRD 102. Again, the octagon two-dimensional convex shape of the lens array assembly 100 is an example for illustration purposes and may be a different shaped based on the design of the lens array assembly 100.

Figure 2:
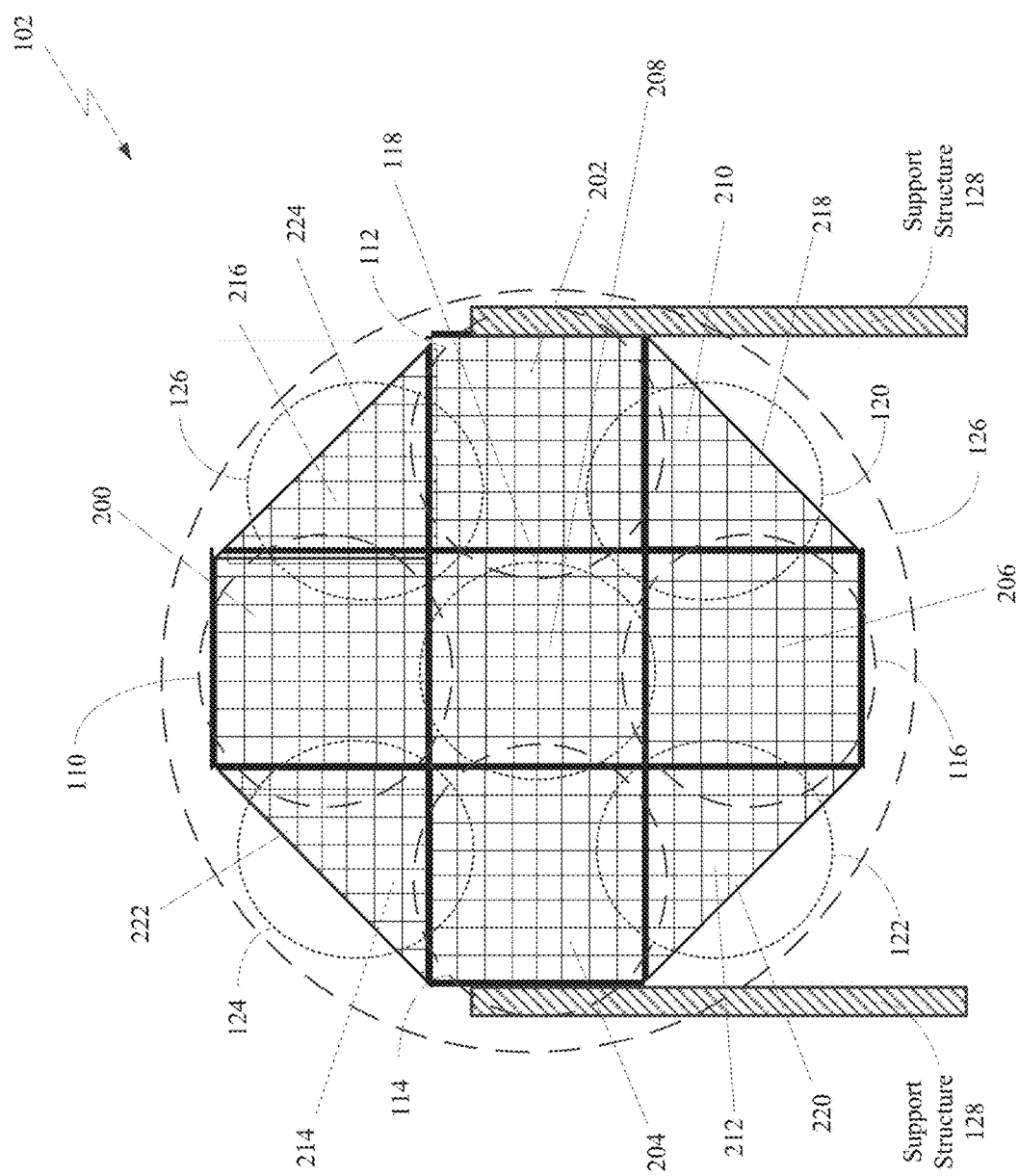
FIG. 2 is a back-view of the lens array assembly shown in FIG. 1 in accordance with the present disclosure.

Turning to FIG. 2, a back-view of the lens array assembly 100, shown in FIG. 1 along viewing plane A-A' 140, is shown in accordance with the present disclosure. FIG. 2 better illustrates the relationship of the plurality of sub-assemblies 110, 112, 114, 116, 118, 120, 122, 124, and 126 and plurality of lens panes 104 in relationship with the lens array assembly 100. As described earlier, in this example, the lens array assembly 100 has an octagon shape and includes five rectangular shaped lens array sub-assemblies 110, 112, 114, 116, and 118, respectively, and four triangular shaped lens sub-assemblies 120, 122, 124, and 126, respectively. In this example, as described earlier, the five rectangular shaped lens array sub-assemblies 110, 112, 114, 116, and 118 include 64 lens panes designated by 200, 202, 204, 206, and 208, respectively. Similarly, the four triangular shaped lens array sub-assemblies 120, 122, 124, and 126 include 28 lens panes designated by 210, 212, 214, and 216, respectively, and 8 partial sized lens panes 218, 220, 222, and 224, respectively. If the four triangular shaped lens array sub-assemblies 120, 122, 124, and 126 are generally equivalent to half of a rectangular shaped lens array sub-assemblies, then the four triangular shaped lens array sub-assemblies 120, 122, 124, and 126 act as the equivalent of two rectangular shaped lens array sub-assemblies. In this case, the lens array assembly 100 may be described as having a total of seven (7) rectangular shaped lens array sub-assemblies instead of nine (9). As a result, the SRD 100 would have a total equivalent of 448 lens panes attached to the lens array assembly 100.

In general, the amount of energy produced by the SRD 102 is directly related to location where the SRD 102 will be utilized and the array size of the lens array assembly 100. The higher the concentration of sunlight the higher the amount of energy that may be produced by the SRD 102 for a given size of the lens array assembly 100. Specifically, according to the National Renewable Energy Laboratory ("NREL") average data from 1998 to 2009, areas within the United States such as Arizona and parts of California, Nevada, New Mexico, Colorado, and Hawaii receive as an annual average over 7.5 Kilowatt hours ("KWh") per square meter ($m^2$) per day of concentrated solar power ("CSP") that is available for use by solar systems.

Generally, the amount of solar energy which falls on the Earth in any a calendar year dwarfs the total energy output of all the world's fossil fuels used in world's industries. For example, the State of Kentucky receives about 3.75 kW/$m^2$ of solar energy per day from the Sun and higher energy areas, such as Hawaii, receive about 5.75 kW/$m^2$ of solar energy per day. Only a fraction of these totals are used for creating useable energy with the current solar cells because, current commonly used solar cells generally only reach about 18% energy conversion due to losses of heat, reflection angle, and electricity transfer.

As such, utilizing Hawaii as an example for melting aluminum, a 6 foot by 6 foot (i.e., an area of about 4 $m^2$) lens array sub-assembly 110, 112, 114, 116, and 118 would be able to focus about 4 KWh of solar energy such that the lens array assembly 100 would be able to focus at least 28 KWh of solar energy taking into account the five (5) rectangular shaped lens array sub-assemblies 110, 112, 114, 116, and 118 and four (4) triangular shaped lens array sub-assemblies 120, 122, 124, and 126. Assuming, 85% efficiency in this example, the SRD 102 would be capable of melting about 74 pounds of aluminum per hour.

Figure 3:
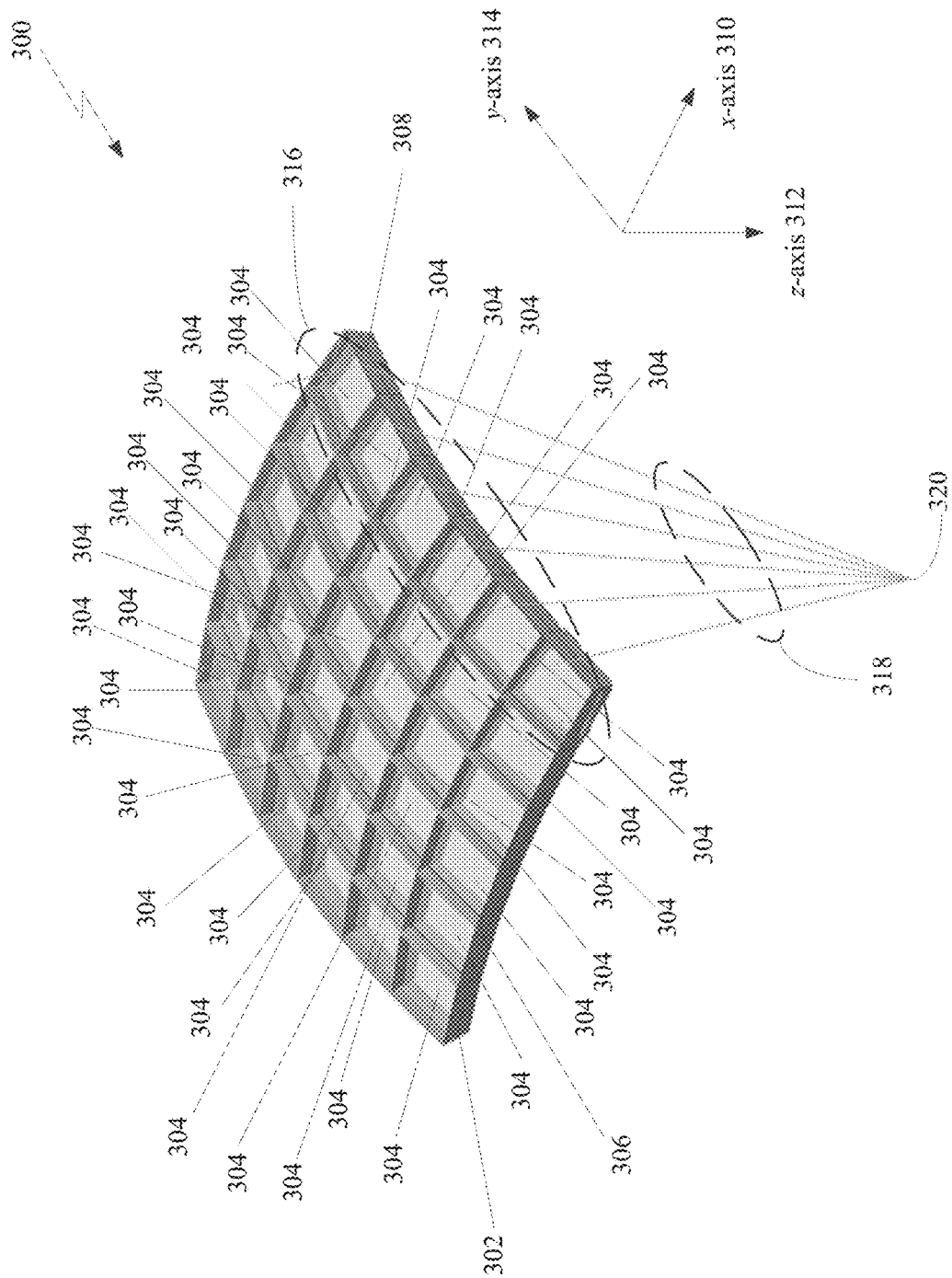
FIG. 3 is a perspective back-view of an example of an implementation of a lens array sub-assembly of the lens array assembly shown in FIGS. 1 and 2 in accordance with the present disclosure.

In FIG. 3, a perspective back-view of an example of an implementation of a lens array sub-assembly 300 of the lens array assembly 100 (shown in FIGS. 1 and 2) is shown in accordance with the present disclosure. The lens array sub-assembly 300 is show including a support frame 302 and approximately 36 lens panes 304 organized in six (6) rows and six (6) columns. The reason for only showing six (6) columns and rows in this example is for convenience of illustration since every lens pane 304 is being shown within a support frame of the lens array sub-assembly 300. The support frame is shown having a first side 306 and a second side 308. In this example, the convex curvature of the first side 306 of the support frame is shown along the x-axis 310 and z-axis 312. Similarly, the convex curvature of the second side 308 of the support frame is shown along the y-axis 314 and z-axis 312. As described earlier, the convex curvature may be approximately parabolic for both the first and second sides 306 and 308 of the support frame. If approximately parabolic, the lens array assembly 100 will produce a more focused beam of refracted solar energy 138 because in general a parabola is a special curve that has the mathematical relationship that any point along the curve of a parabola is equidistant from a fixed point (mathematically referred to as the focus of the parabola but not to be confused with the terms focus utilized in the present disclosure) within the curve of the parabola.

Figure 4:
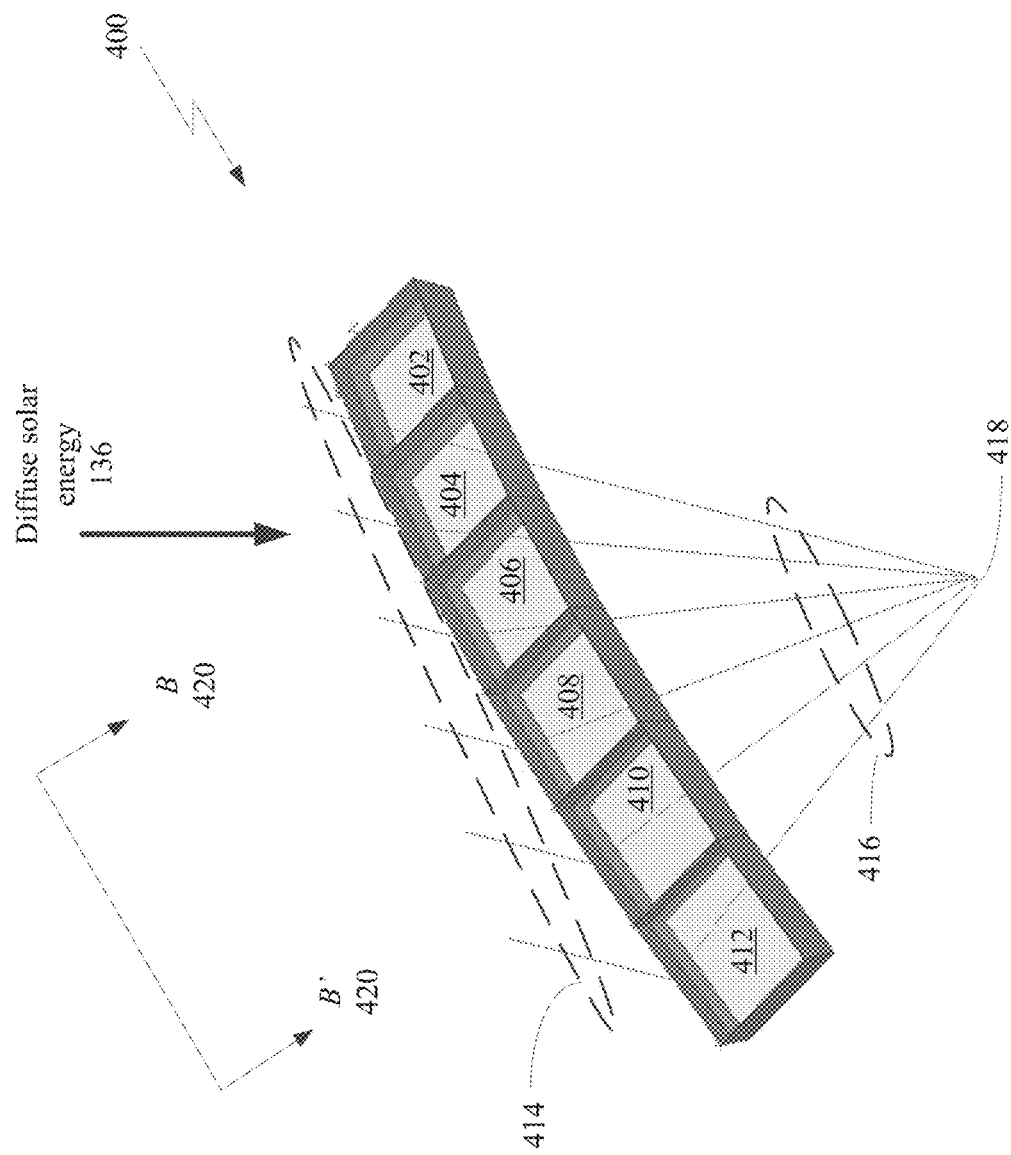
FIG. 4 is a perspective back-view of an example of an implementation of a single column array of lens panes of the lens array sub-assembly shown in FIGS. 1, 2, and 3 in accordance with the present disclosure.

Additionally, in FIG. 3, the panes 304 of a first column 316 of panes 304 is shown receiving diffuse solar energy and focusing 318 it to a focal point 320. More specifically, turning to FIG. 4, a perspective back-view of an example of an implementation of a single column array of lens panes 400 of the lens array sub-assembly shown 300 (shown in FIG. 3) is shown in accordance with the present disclosure. In this example, the single column array of lens panes 400 includes six (6) lens panes 402, 404, 406, 408, 410, and 412. As an example of operation, the single column array of lens panes 400 is configured to receive a portion 414 of the diffuse solar energy 136 that impinges on the outside surface of the SRD and refract that portion 414 through the lens panes 402, 404, 406, 408, 410, and 412 to produce a focused beam 416 of solar energy that is focused to focal point 418.

Figure 5B:
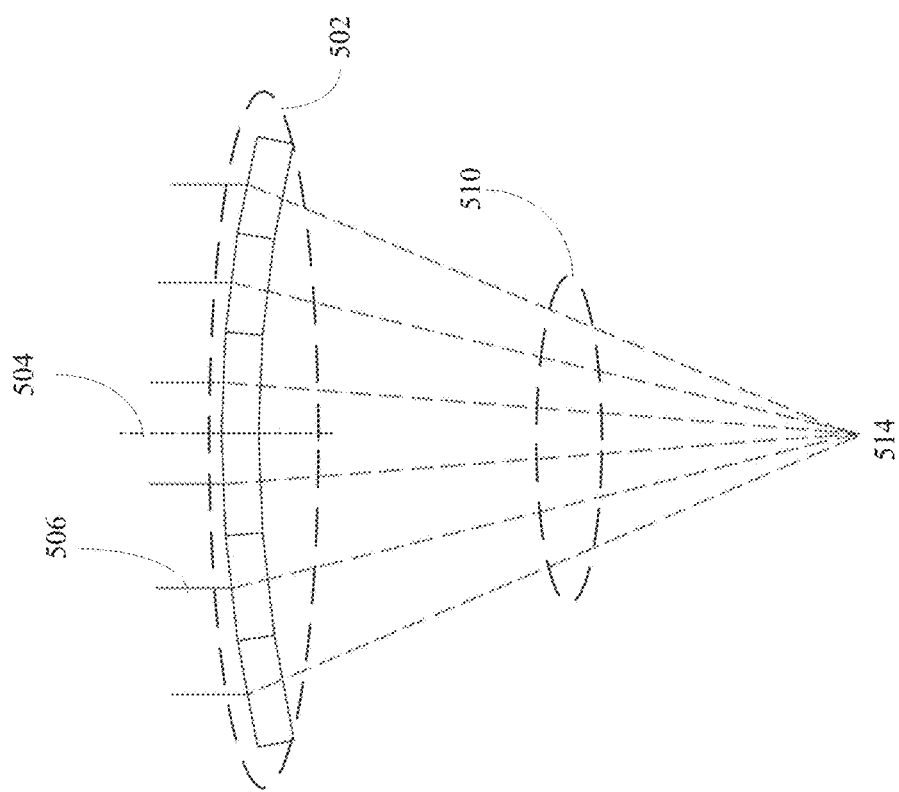
FIG. 5B is a system view of the single column array of lens panes shown in FIG. 4 in accordance with the present disclosure.
Figure 5A:
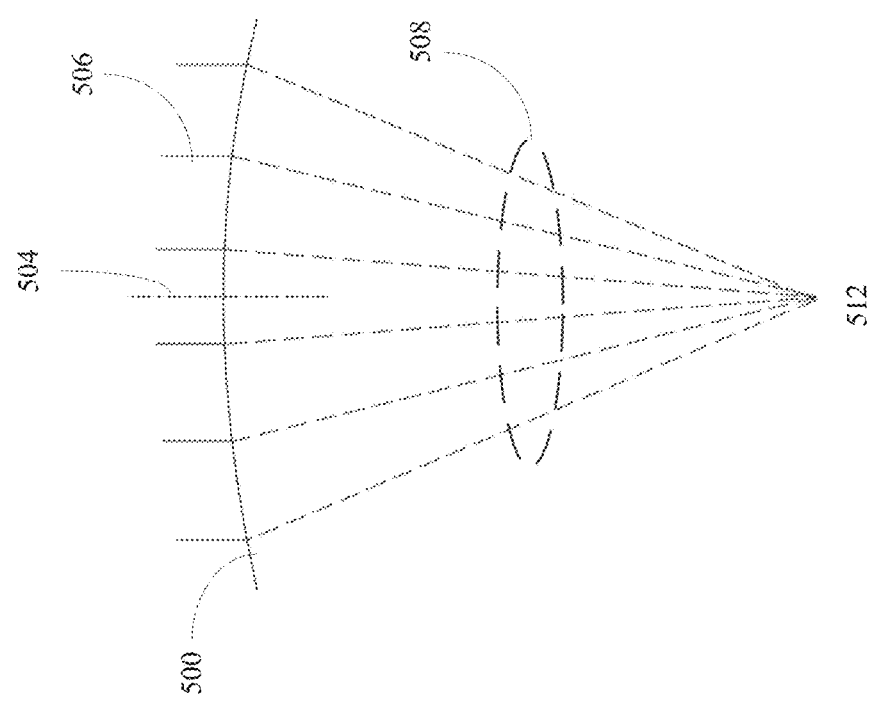
FIG. 5A is a system view of an example of implementation of a diffracting convex lens.

To further explain this example, in FIGS. 5A and 5B, system views of a continuous diffracting convex lens 500 and of the single column array of lens panes 502 (shown in FIG. 4 cut along plane B-B' 420) are shown along a center line 504. In both examples, impinging diffuse solar energy 506 is diffracted and focused 508 and 510 to focal points 512 and 514, respectively. As a result, in operation, the discrete diffracting convex lens created by the single column array of lens panes 502 focuses 510 the diffracted solar energy to approximately the same focal point 514 as the focal point 512 of the continuous diffracting convex lens 500.

Figure 6:
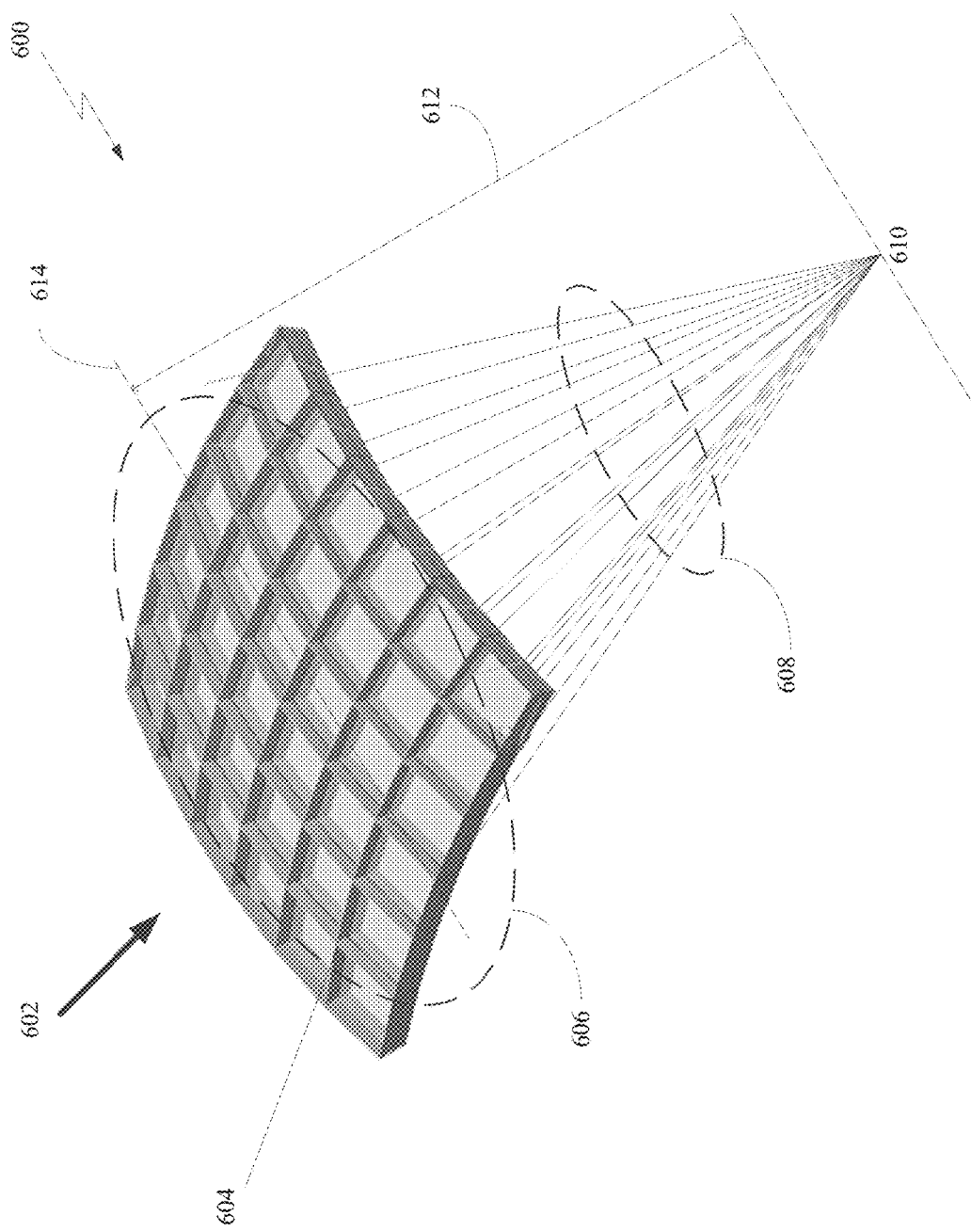
FIG. 6 is a perspective side-view of the lens array sub-assembly shown in FIG. 3 in accordance with the present disclosure.

In FIG. 6, a perspective side-view of the lens array sub-assembly 600 (shown in FIG. 3 as lens array sub-assembly 300) is shown in accordance with the present disclosure. Unlike the FIG. 3, in FIG. 6, an example of operation is shown where the diffuse solar energy 602 impinges on the outside surface 604 of the lens array sub-assembly 600 that includes the plurality of lens panes 606. The each lens pane of the plurality of lens panes 606 then diffracts a portion of the diffuse solar energy 602 and all of the diffracted beams from the plurality of lens panes 606 are focused 608 into a focal point 610 that is utilized to heat or melt an industrial material (not shown). In this example, the focal length 612 of the lens array sub-assembly 600 is shown as the distance between the focal point 610 and a center-line 614 of the lens array sub-assembly 600. This focal length 612 is based on the design of the lens array sub-assembly 600. Turning back to FIGS. 1 and 2, it is noted that there are multiple lens array sub-assemblies 110, 112, 114, 116, 118, 120, 122, 124, and 126 that may each have their own corresponding focal length. Additionally, these multiple focal lengths may be equal or not equal based on the design of the SRD for heating or melting an industrial material. By having different focal lengths or different focal points for each lens array sub-assembly 110, 112, 114, 116, 118, 120, 122, 124, and 126, the lens array assembly 100 may be configured to focus the diffused solar energy that is a small area instead on a point. This allows the SRD 102 to be configured to melt an industrial material at a heating plane within a heating container by distributing the heat of the focused solar energy over a small area at the heating plane. If the focused solar energy is not distributed over a small area, it may potential burn through the industrial material and potentially damage the heating container because at a single focused point the energy too intense to properly be controlled as a furnace.

Figure 7:
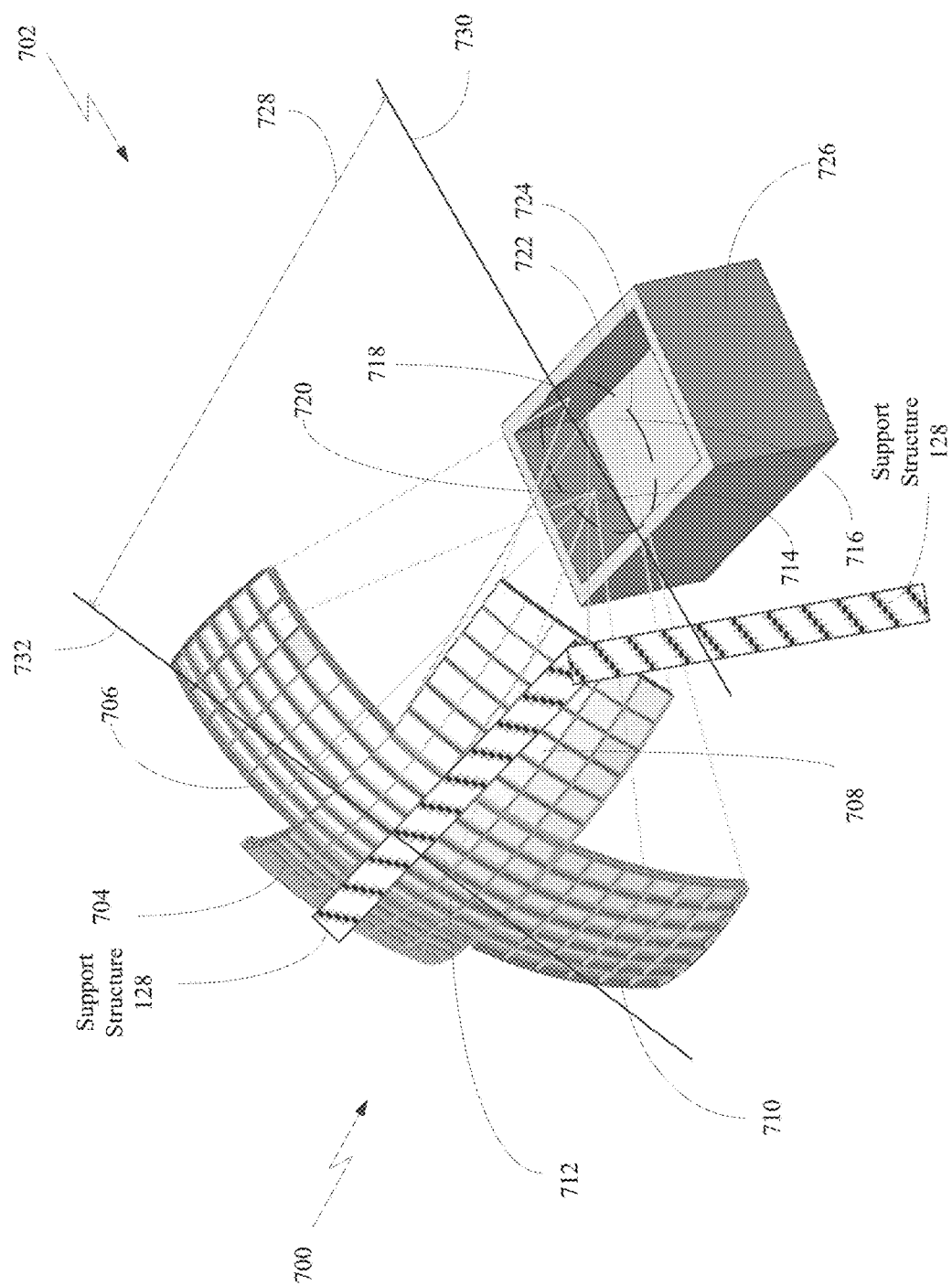
FIG. 7 is a perspective back-view of another example of an implementation of a lens array assembly of the SRD and a heating container in accordance with the present disclosure.

Expanding on this in FIG. 7, a perspective back-view of another example of an implementation of a lens array assembly 700 of the SRD 702 is shown in accordance with the present disclosure. In this example, the lens array assembly 700 is shown having five (5) rectangular shaped lens array sub-assemblies 704, 706, 708, 710, and 712, respectively. Additional triangular shaped lens array sub-assemblies may also be added as described earlier, however, in this example only five (5) rectangular shaped lens array sub-assemblies 704, 706, 708, 710, and 712 are shown for the purposed of illustration. In this example, the lens array assembly 700 is shown having five different focal lengths or focal points 714, 716, 718, 720, and 722 for the individual lens array sub-assemblies 704, 706, 708, 710, and 712. The resulting focal points define the small heating area 724 in the heating container 726. In general, by not directing the refracted light into a single direction, the light may be focused onto the small heating area 724 that is small enough to heat or even melt the industrial material in the heating container 726 while large enough to maintain the heated or melted industrial material at a desired temperature.

Additionally shown in this example is the support structure 128 that may be supporting the lens array assembly 700. In this example, the heating area 724 is shown to be a predetermined distance 728 from the lens array assembly 700. Specifically, the predetermined distance 728 is the distance 728 between a center-line 730 of the plane of the heating area 724 and another center-line 732 of the lens array assembly 700. The predetermined distance 728 is generally related to the focal lengths of the individual lens array sub-assemblies 704, 706, 708, 710, and 712 the corresponding produce the focal points 714, 716, 718, 720, and 722 that result in the heating area 724. As a result, the predetermined distance 728 is based on the design of the lens array assembly 700 because the focal lengths are based on the design of the lens array sub-assembly 700. The support structure 128 is configured to maintain this predetermined distance 728 between the lens array assembly 700 and the heating area 724 within the heating container 726. As such, since the type of material, thickness, position, and angle of the lens panes within each lens array sub-assemblies 704, 706, 708, 710, and 712 determines the corresponding focal points 714, 716, 718, 720, and 722, it is appreciated that the type of material, thickness, position, and angle of the lens panes within each lens array sub-assemblies 704, 706, 708, 710, and 712 may also be designed such that they produce the corresponding focal points 714, 716, 718, 720, and 722 at the predetermined distance 728.

Figure 8:
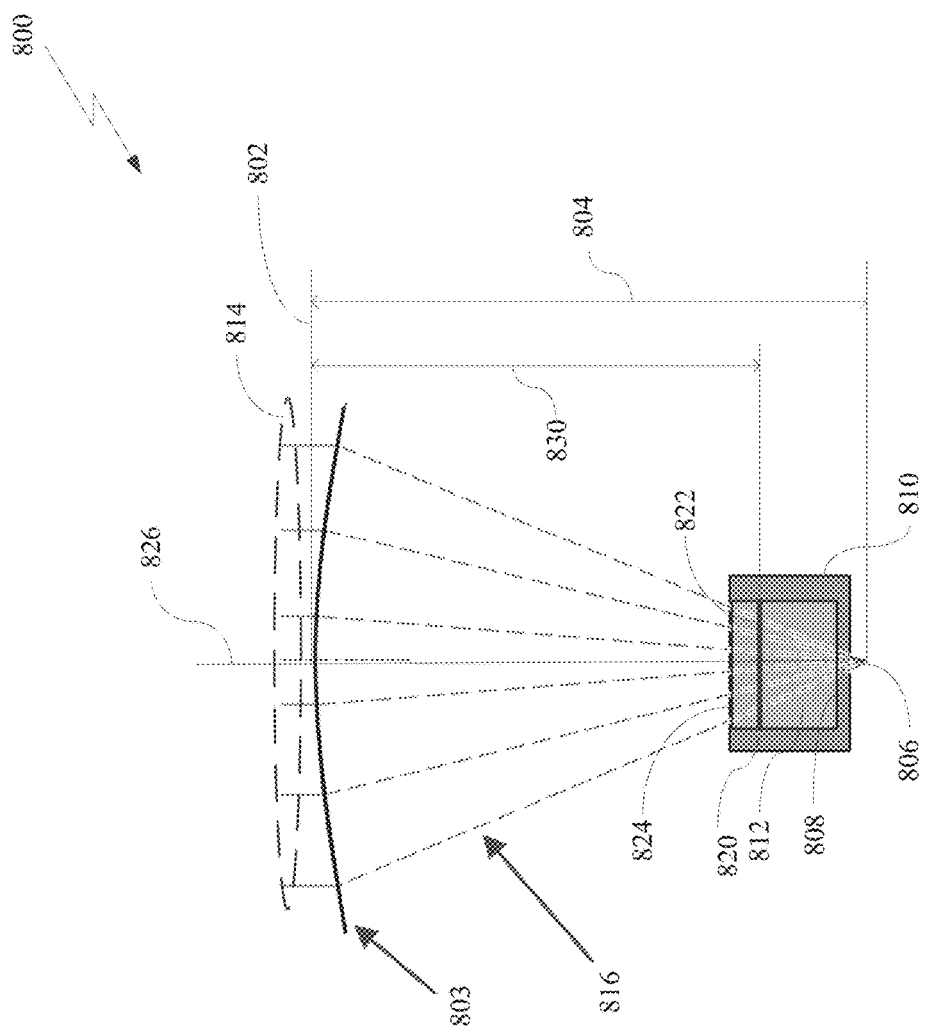
FIG. 8 is a system view of SRD shown in FIG. 7 in accordance with the present invention.

Turning to FIG. 8, an alternative approach is shown. In FIG. 8, a system view of SRD 800 is shown in accordance with the present disclosure. In this example, a center-line 802 is shown for equivalent lens 803 of plurality of lens panes of the SRD 800 and the SRD 800 is shown to have a focal length 804 that extends to a focal point 806 past the bottom 808 of the heating container 810. As an example of operation, the heating container 810 is full of industrial material 812 to be melted such as, for example, aluminum. The impinging diffuse solar energy 814 is refracted by the plurality of lens panes of the SRD 800 to form a plurality of refracted solar beams 816 (also known as rays) that are focused to focal point 806 past the bottom 808 of the heating container 810. Since, the heating container 810 is full of aluminum 812 to melt the focused refracted solar beams 816 cannot concentrate their combined energy at focal point 806 and instead impinge on the aluminum 812 at a heating plane 820 that may correspond to the fill line of the aluminum 812 in the heating container 810. Since the heating plane 820 corresponds to a heating area 822 at the opening 824 of the heating container 810, the resulting heat generated by the focused refracted solar beams 816 is distributed by the heating area 822 which is a relatively small area compared to the size of the SRD 800. By properly designing the SRD 800, the heating area 822 receives the proper amount of energy from the SRD 800 to either properly heat or melt the industrial material (in this example aluminum) 812 in the heating container. In general, since SRD 800 focus light with minimal energy loss, the highest intensity of light is in the center 826 but is more diffuse moving outwards from the center 826. As such, the highest intensity of heat in the heating plane 820 is at the center and then lowers in intensity away from the center 826 resulting in effective heating area 822. As described earlier, the focal length 804 is related to the predetermined length 830 between the center-line 802 of equivalent lens 803 to the heating container 810 where the predetermined length 830 is the length from the center-line 802 to the heating plane 820 within the heating container 810.

Figure 9:
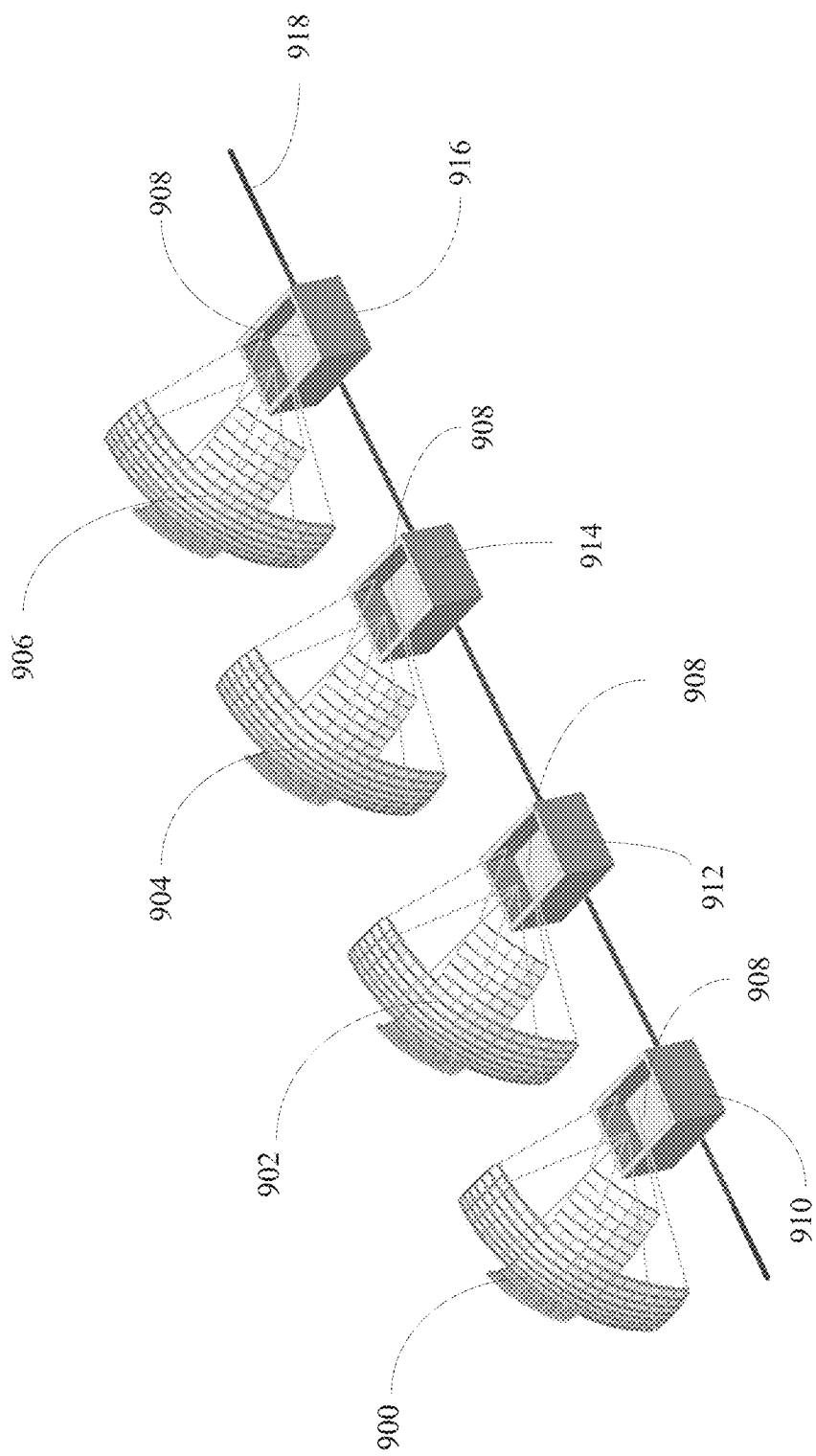
FIG. 9 is a perspective back-view of a plurality of SRDs, as shown in FIGS. 7 and 8, utilized to melt an industrial material in accordance with the present disclosure.

In some melting cases, an individual SRD 800 may not be able to properly generate enough energy to properly melt an industrial material 812 in a heating container 810 or to melt enough quantity of the industrial material 812 to be competitive with non-solar methods. In these cases, multiple SRDs may be utilized in a chain to increase the amount of industrial material to be melted, heat the industrial material in stages, or both. In FIG. 9, a perspective back-view of a plurality of SRDs 900, 902, 904, and 906 are shown in accordance with the present disclosure. In this example, the SRDs 900, 902, 904, and 906 are utilized to melt an industrial material 908 in a plurality of heating containers 910, 912, 914, and 916, respectively. In this example, the multiple SRDs 900, 902, 904, and 906 may be positioned by any known solar tracking system to collect the optimal quantity of solar light during the day. To maintain the optimal energy focusing of the SRDs 900, 902, 904, and 906, the heating containers 910, 912, 914, and 916 may be moved from one SRD to the next via a track system 918. In this example, the track system 918 may be configured to input or extract a given heating container 910, 912, 914, and 916 at any point during the heating and melting process to remove melted or heated material and input new materials in new heating containers (not shown).

Figure 10:
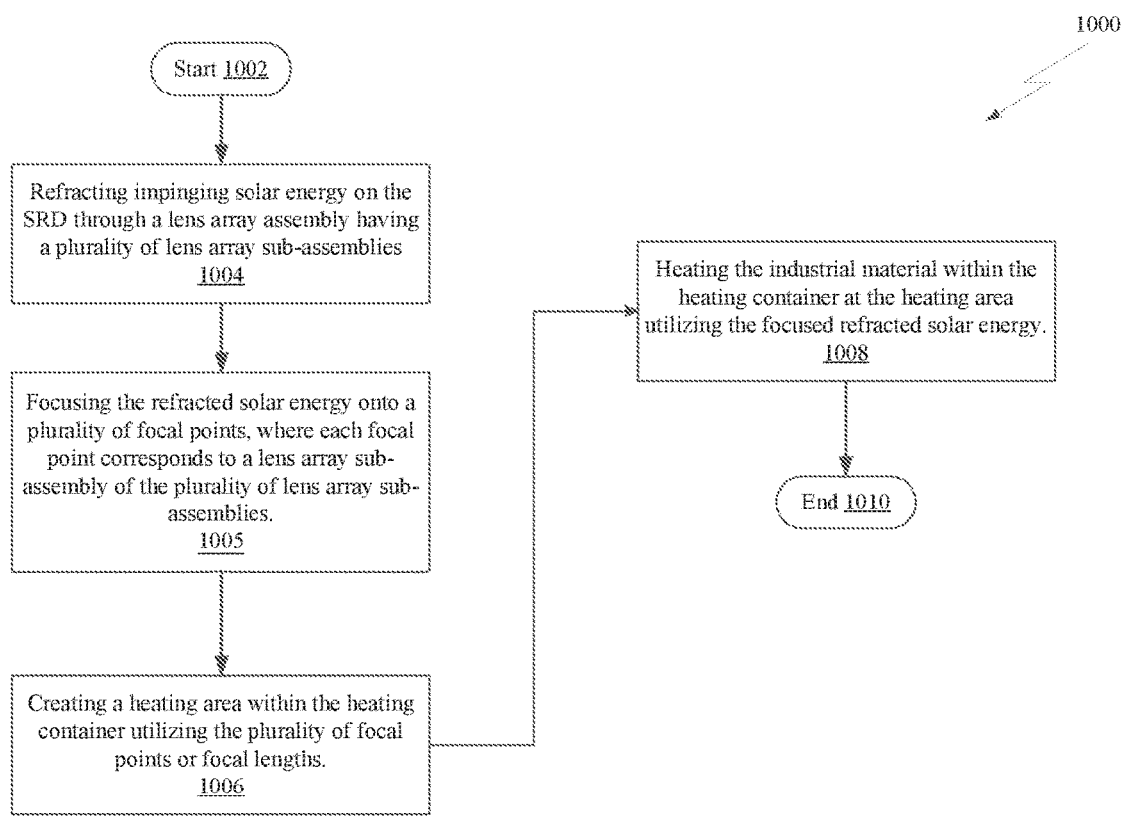
FIG. 10 is a flowchart of an example of an implementation of process performed by the SRD shown in FIGS. 1-9 in accordance with the present disclosure.

Turning to FIG. 10, a flowchart 1000 of an example process performed by the SRD is shown in accordance with the present disclosure. In general, the process includes heating an industrial material within a heating container with the SRD. The method starts 1002 by, in step 1004, refracting impinging solar energy on the SRD through a lens array assembly having a plurality of lens array sub-assemblies and, in step 1005, focusing the refracted solar energy onto a plurality of focal points, where each focal point corresponds to a lens array sub-assembly of the plurality of lens array sub-assemblies. The method then, in step 1006, creates a heating area within the heating container utilizing the plurality of focal points or focal lengths and then, in step 1008, heats the industrial material within the heating container at the heating area utilizing the focused refracted solar energy. The process then ends 1010.

Figure 11:
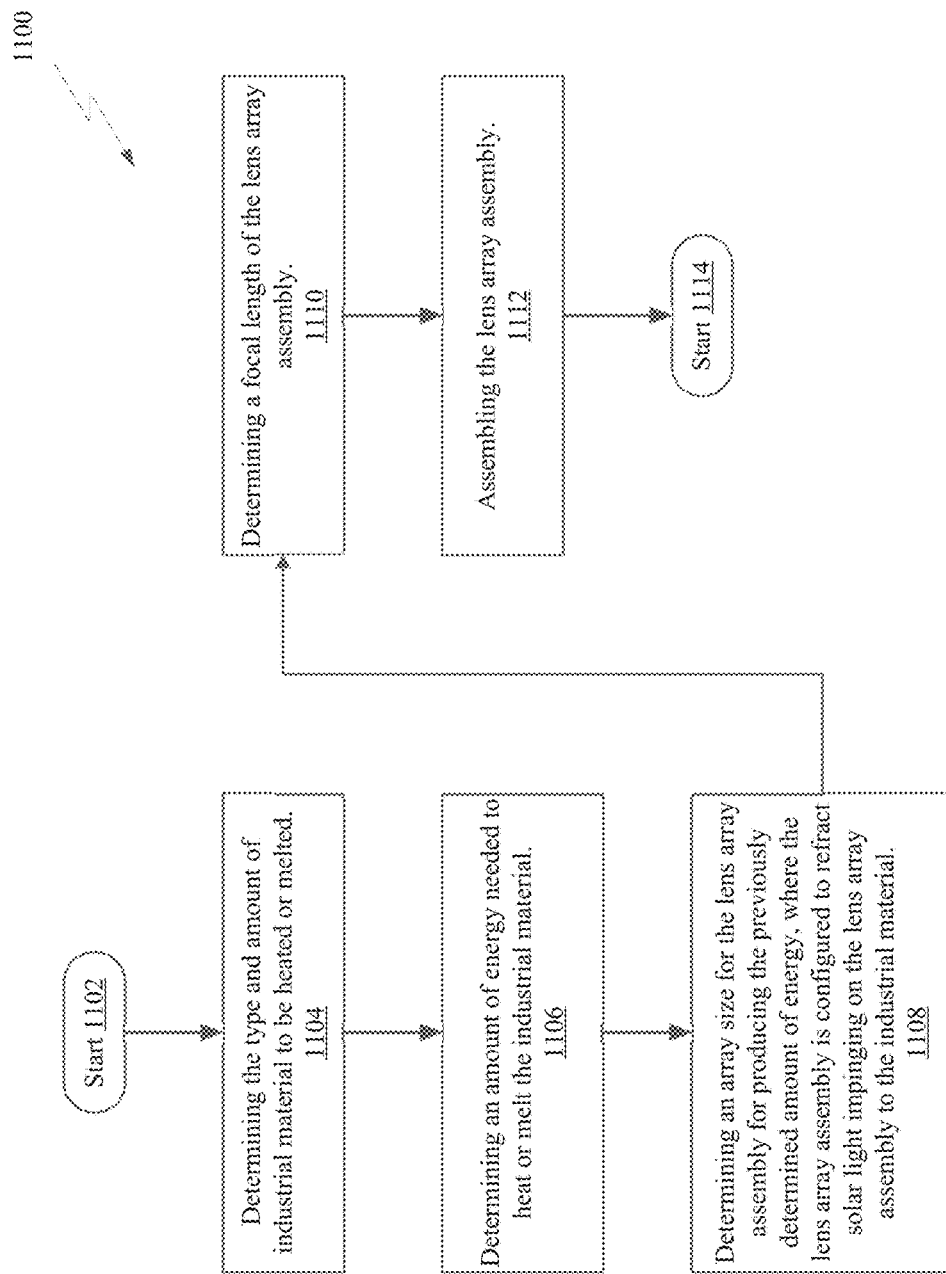
FIG. 11 is a flowchart of an example of an implementation of process performed in fabricating the SRD in accordance with the present disclosure.

In FIG. 11, a flowchart 1100 of an example process performed in fabricating the SRD is shown in accordance with the present disclosure. The process begins 1102 by determining the type and amount of industrial material to be melted in step 1104. For example, if the application type may include heating or melting aluminum, steel, or other metal, pre-heating or melting a non-metallic industrial material, heating water, heating, softening, or melting plastic. Once this is determined, the process (in step 1106) includes determining an amount of energy needed to heat or melt the industrial material. As an example, to melt aluminum, the SRD needs to produce approximately 30,000 watts to melt about 100 pounds of aluminum per hour. The process, in step 1108, then includes determining an array size for the lens array assembly for producing the previously determined amount of energy, where the lens array assembly is configured to refract solar light impinging on the lens array assembly to the industrial material. As an example, in Hawaii the Sun produces about 1,000 watts per square meter so the lens array assembly needs to be approximately 30 m$^2$ (i.e., about 6 meters by 6 meters). The process then, in step 1110, determines a focal length of the lens array assembly based on the geometry of the lens array assembly. The process, in step 1112, includes assembling the lens array assembly. The process then ends 1114. In this example, assembling the lens array assembly may also include assembling a plurality of lens array sub-assemblies and attaching the plurality of lens array sub-assemblies into the lens array assembly, where each lens array sub-assembly has a corresponding focal length and wherein each lens array sub-assembly has a convex shape. Assembling the lens array assembly may further include attaching a plurality of lens panes to each plurality of lens array sub-assemblies, where the lens panes may include Fresnel lenses. Moreover, assembling the lens array assembly may also include a first lens array sub-assembly with a different corresponding focal length than a second focal length corresponding to a second lens array sub-assembly.

It is appreciated by those of ordinary skill in the art that while the previous examples describe heating and melting industrial materials in heating container, the SRD may also be utilized to heat (and not melt) different types of materials for use in, for example, industrial boilers and electrochemical processors where the energy provided by the SRD is used to heat intermediate materials such as water to produce steam that may be utilized for other processes such as powering turbines, heating chemicals, or providing heat transfer for other types of heating systems.

Figure 12:
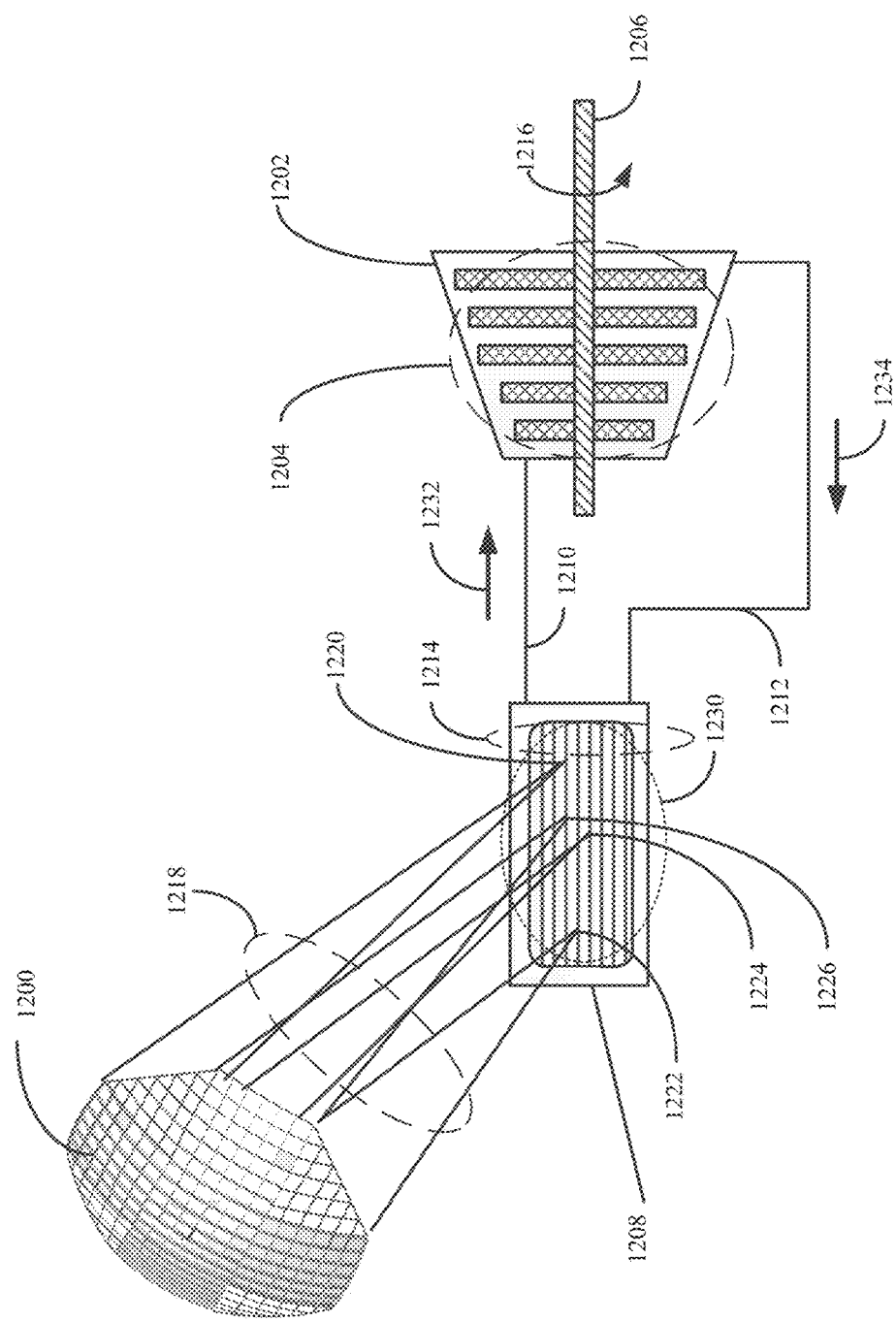
FIG. 12 is a system diagram of an example of an implementation of the SRD utilized for powering a turbine in accordance with the present disclosure.

Turning to FIG. 12, a system diagram of an example of an implementation of the SRD 1200 utilized for powering a turbine 1202 is shown in accordance with the present disclosure. The turbine 1202 may include a plurality of turbine blades (also known as vanes) 1204 and a shaft 1206. In this example, the turbine 1202 is connected to a heating container 1208 via at least an inflow tubular pipe 1210 and outflow tubular pipe 1212. The heating container 1208 may have a plurality of heating pipes 1214 within the heating container 1208 that are configured to be heated by the SRD 1200. The heating pipes 1214 may be filled with a fluid such as, for example, a gas (such as, for example, air), steam, water, or other heatable fluid that is capable of being heated in the heating container 1208 and passed to the turbine 1202 which is a rotary machine that extracts the energy from the resulting fluid flow and converts it into useful work energy that rotates 1216 the shaft 1206. In an example of operation, the SRD 1200 may receive solar energy and focus 1218 it towards the heating pipes 1214 of the heating container 1208. As before, multiple focal points 1220, 1222, 1224, and 1228 may be focused 1218 towards the heating container 1208 resulting in a heating area 1230 along the heating container 1208. The fluid in the heating pipes 1214 is then heated up and heated fluid 1232 passed to the turbine 1202 via inflow tubular pipe 1210. The heated fluid turns the turbine blades 1204 resulting in the shaft 1206 rotating 1216 along its axis. The exhausted fluid is returned to the heating container 1208 via the outflow tubular pipe 1212. It is appreciated by those of ordinary skill in the art that other industrial heating examples may also be implemented by utilizing the SRD 1200 as a heating device for other industrial materials.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A solar refraction device ("SRD") for heating a heating container having a bottom with diffuse solar energy that impinges on an outside surface of the SRD and is refracted through the SRD, the SRD comprising:
   a lens array assembly, wherein the lens array assembly includes an outside surface corresponding to the outside surface of the SRD, an inside surface, and a plurality of lens array sub-assemblies,
   wherein a first lens array sub-assembly, of the plurality of lens array sub-assemblies, has a substantially parabolic shape and is configured to maintain a plurality of lens panes arranged in an array of columns and rows in a fixed relationship, and
   wherein the lens array assembly is configured to have a plurality of focal lengths.

2. The SRD of claim 1, wherein each of the plurality of lens panes is configured to refract and focus the diffuse solar energy onto a heating area within the heating container.

3. The SRD of claim 2,
   wherein an outside surface of the first lens array sub-assembly has a convex shape,
   wherein each lens array sub-assembly is configured to have a focal length that is beyond the bottom of the heating container so as to define a heating plane within the heating container above the bottom of the heating container, and
   wherein the heating plane corresponds to the heating area.

4. The SRD of claim 3, further including a support structure connected to the lens array assembly, wherein the support structure is configured to support the lens array assembly at a predetermined distance from the heating container.

5. The SRD of claim 4, further including a solar tracker connected to the support structure, wherein the solar tracker is configured to move the support structure to focus the diffuse solar energy being refracted through the SRD at the heating area.

6. The SRD of claim 2, wherein at least one of the plurality of the lens panes are Fresnel lenses.

7. The SRD of claim 1,
   wherein each of the plurality of lens panes is attached to the lens array assembly at an angle to the heating container, and
   wherein a second lens array sub-assembly of the plurality of lens array sub-assemblies has an approximately parabolic shape.

8. The SRD of claim 7, wherein the lens array assembly includes at least five (5) lens array sub-assemblies.

9. The SRD of claim 1, wherein the first lens array sub-assembly has a focal length that is different than a focal length corresponding to a second lens array sub-assembly.

10. The SRD of claim 1, wherein each column contains an equal number of lens panes, and wherein each row contains an equal number of lens panes.

11. The SRD of claim 1, wherein each of the plurality of the lens panes has substantially the same length and width dimensions.

12. The SRD of claim 1, wherein the first lens array sub-assembly is in direct physical contact with a second lens array sub-assembly.

13. The SRD of claim 1, wherein each of the plurality of the lens panes is mounted within a frame.

14. The SRD of claim 1, wherein the plurality of lens panes of the first lens array sub-assembly are arranged in a square shape or triangular shape.

15. The SRD of claim 1, wherein the first lens array sub-assembly is configured to have a different focal point than a second lens array sub-assembly.

* * * * *